United States Patent [19]

Roller et al.

[11] 3,836,395

[45] Sept. 17, 1974

[54] MANUFACTURE OF MAGNETIC RECORDING MEDIA

[75] Inventors: Herman Roller; Heinz Stritzinger; Job-Werner Hartmann, all of Ludwigshafen; Roland Falk; Werner Balz, both of Willstaett, all of Germany

[73] Assignee: Badische Anilin & Soda-Fabrik Aktiengesellschaft, Ludwigshafen/Rhein, Germany

[22] Filed: Apr. 19, 1972

[21] Appl. No.: 245,471

[52] U.S. Cl. ................ 117/238, 117/235, 252/62.54

[51] Int. Cl. ........................................... H01f 10/02

[58] Field of Search ........... 117/235, 236, 237, 238, 117/239, 240; 252/62.54; 241/22

[56] References Cited

UNITED STATES PATENTS

| | | | |
|---|---|---|---|
| 1,837,772 | 12/1931 | Hailwood et al. | 252/310 |
| 2,212,641 | 8/1940 | Hucks | 241/21 |
| 2,581,414 | 1/1952 | Hochberg | 241/22 |
| 3,526,598 | 9/1970 | Lemke | 117/235 |

*Primary Examiner*—William D. Martin
*Assistant Examiner*—Bernard D. Pianalto
*Attorney, Agent, or Firm*—Johnston, Keil, Thompson & Shurtleff

[57] ABSTRACT

A process for the manufacture of magnetic recording media exhibiting good orientation of the magnetic particles by coating a base with a viscous liquid dispersion of magnetic pigment, orienting the applied magnetizable particles by means of a magnetic field and drying the applied magnetic pigment dispersion. According to the invention, the magnetic pigment dispersion is subjected, immediately prior to the coating operation, to shear at a specific minimum shear rate gradient.

1 Claim, 4 Drawing Figures

$\frac{v}{s}$ [cm/sec pro cm = sec$^{-1}$]

MANUFACTURE OF MAGNETIC RECORDING MEDIA

This invention relates to a process for the manufacture of magnetic recording media by coating a non-magnetic base with a viscous liquid dispersion of a magnetic pigment in a binder solution followed by orientation of the applied magnetizable particles and subsequent drying of the applied magnetic pigment dispersion.

Magnetic recording media are generally manufactured by applying a magnetic pigment dispersion to a rigid or flexible base. The dispersion applied in liquid form is dried or cured to give a firmly adhering dry magnetic coating. Magnetic recording media of this kind are very frequently used in the form of tapes.

There is usually provided, downstream of the coating equipment but upstream of the drying means, a magnetic field for aligning the acicular magnetizable particles in the desired direction. The magnetic dispersion, immediately after application to the base, is passed through the field of a permanent magnetic or electromagnet. The magnetic particles which are usually acicular thus align their longitudinal axes with the applied magnetic field. In the finished magnetic tape, by virtue of the said orientation, the remanent flux in the direction of orientation of the magnetic particles is greater than the direction at right-angles thereto. The ratio of these two parameters to each other is referred to as the oreientation ratio and is a measure of the degree of alignment of the magnetic particles.

The aforementioned orientation improves the magnetic properties of the tape. The ability of the magnetic pigments to undergo orientation depends, inter alia, on the magnetic pigments themselves and on the composition of the viscous magnetic pigment dispersion, in particular on the binder used and on the solvent and dispersing agent contained therein, as well as on the physical properties of the pigment dispersion, for example its viscosity and yield value.

There has been no lack of attempts and proposals to improve the orientation ratio. It has been found for example that improved orientation ratios are obtained when the viscosity and yield value of the mix are as high as possible. However, improvement by this means cannot be carried beyond a certain point as it is no longer possible to obtain a sufficiently fine dispersion of the magnetic particles when the viscosity or yield value is too high. If the yield value is too high, it is not possible, with the coating techniques employed, to obtain absolutely smooth coatings and the resulting magnetic coatings contain ridges or other surface flaws.

Experience has shown that for a given magnetic pigment dispersion and a given magnet used for orientation the best orientation ratios are obtained when the viscosity is as high as possible, i.e., when a minimum of solvent is used. For example, a liquid magnetic dispersion containing 55 percent by weight of solvent gives an orientation ratio of, say, 1.5 using a speicific coater; under the same conditions, the orientation ratio may be raised to 1.65 if the mix contains only 50 percent by weight of solvent.

We have now found that the orientation ratio of magnetic recording media can be substantially improved if, in the manufacture of magnetic recording media comprising coating a non-magnetizable base with a viscous liquid magnetic pigment dispersion followed by orientation of the applied magnetizable particles in a magnetic field, the liquid magnetic dispersion is subjected, immediately prior to the coating operation, to shear at a shear rate of at least 480 cm/s and a shear rate gradient of at least 680 cm/sec/cm (i.e., 680 $sec^{-1}$).

BRIEF DESCRIPTION OF THE DRAWINGS

FIG. 3 is a schematic representation of the device used in the process, and is used to define the terms used in the specification.

Figure 1A:
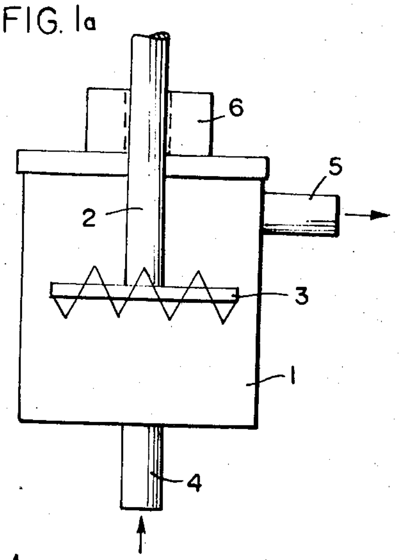
FIG. 1*a* is a view showing the details of the construction of a preferred embodiment of the apparatus for practicing Applicants' process.

The process of the invention is based on the surprising fact that improved orientation ratios may be obtained by subjecting the viscous magnetic pigment dispersion, immediately prior to coating and subsequent orientation, to high shear at a shear rate v of at least 480 cm/sec and a shear rate gradient $v/s$ of at least 680 $sec^{-1}$, shear rate v and shear gradient $v/s$ being defined more specifically in FIG. 3.

In FIG. 3, the outer circle G designates a cylindrical stirred vessel fitted with a rotating disc or cylinder. From the shear rate $v$ (cm/sec) or peripheral velocity of the point P on the surface of the rotating disc S there is calculated a shear rate gradient of $v/s$ from this point to the wall of the vessel over the distance s (cm), said gradient thus being expressed in cm/sec/cm or $sec^{-1}$.

It is preferred to subject the magnetic pigment dispersion to shear at a shear rate of more than 750 cm/sec and a shear rate gradient of more than 1,100 $sec^{-1}$.

The magnetic pigment dispersions used are highly viscous liquid magnetic pigment dispersions prepared in a conventional manner and based on finely divided acicular magnetic pigment, binder and, optionally, additives, the viscosities of the dispersions being from about 100 to 500 centipoises.

The effective shear gradient ($\tau$) in dynes/cm is calculated as the product of the viscosity ($\eta$) in dynes sec/cm² and shear reate (v) in cm/sec according to the equation $\tau = \eta \times v$ (dynes/cm).

The non-magnetic and non-magnetizable bases which may be used are the usual rigid and flexible base materials such as films of linear polyesters, for example polyethylene terephthalate.

Coating of the base is carried out by means of coaters in which the dispersion is uniformly spread over the base by, say, a knife.

To achieve orientation of the magnetic particles while they are still in a mobile state, the magnetic recording medium is then passed through a magnetic field which should as far as possible be precisely longitudinal. This causes the acicular particles to align their longitudinal axes with the magnetic field which is usually applied in the direction of tape motion. In the following Examples, this orientation of the magnetic particles is carried out in the same manner in each case.

In a preferred embodiment the mix is pretreated by continuously passing a viscous liquid dispersion of magnetic pigment, organic binder and solvent through a tube in which one or more stirrers having stirring discs with a zigzag edge known as dissolver discs rotate very rapidly. Using a tube having a internal diameter of 65 mm and in which a dissolver disc having a diameter of 50 mm is caused to rotate, the shearing action according to the invention is achieved, for example, when the speed of rotation is more than 1,800 r.p.m. and preferably more than 2,900 r.p.m.

In another preferred embodiment the shearing action is produced by a stirred ball mill. Such mills are known as attritors or pebble mills and are descriebed in U.S. Pat. Nos. 2,581,414; 2,212,641; and 1,837,772. It is desirable, in the process of the invention that the magnetic dispersion should pass through the mill without the appreciable ingress of gas, which can be readily achieved. To achieve the shearing action according to the invention, the stirred ball mill is charged with steel balls or spheres of other materials, for example steel balls having a diameter of 0.8 to 5 mm or granular sand-like material having a particle size of from 0.5 to 2 mm. The propeller is caused to rotate at a speed of at least 1,000 r.p.m.

The process of the invention may in principle be used for the treatment of all types of magnetic dispersions, provided they consist of a magnetic pigment dispersed in a binder in the presence of a solvent. Suitable binders are any of the binders conventionally used for this purpose, and they may be used in the usual amounts.

Magnetic dispersions are preferred which contain, as binder, organic solvent-soluble polyamides, polyurethanes, e.g., commercial polyester/polyurethanes or polyether/polyurethanes or polyvinyl esters such as vinyl acetate polymers or mixtures thereof, and magnetic composed of acicular particles.

There is always some improvement in the orientation ratio achieved by orientation of the magnetic particles, the degree of improvement depending on the composition of the magnetic pigment dispersion. This in always accompanied by an increase in the magnetic flux in the longitudinal direction of the tape, which in turn enhances the remanent magnetisn and the saturation magnetization. Consequently, the recording properties of the recording properties of the recording media thus obtained, particularly audio, computer and video tapes, are improved. Significantly, the other properties of the magnetic recording media are not adversely affected in any way by the process of the invention. Another advantage is the improved smoothness of the magnetic coating.

EXAMPLE 1

A magnetic dispersion is prepared from the following:

700 g of acicular γ-iron(III) oxide having a weakly alkaline surface, 35 g of carbon black pigment, 24.5 g of stearic acid and 560 g of a 25 percent solution of a polyamide prepared from 80 parts by weight of caprolactam and 20 parts by weight of heptadecanoic acid 4,4'-diaminodicyclohexylmethane in a mixture of equal parts by weight of toluene and propanol, 58 g of a 60 percent solution of the reaction product of 1 mole of phenol with 1.65 moles of formaldehyde in n-butanol and 770 g of a mixture of equal parts by weight of toluene and propanol.

Figure 1B:
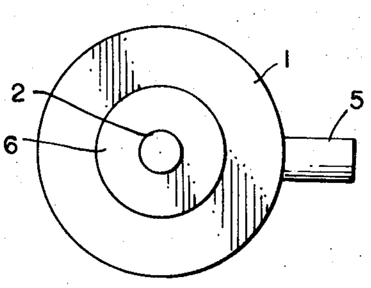
FIG. 1*b* is a top-view of the same apparatus.

Dispersion is carried out for 72 hours in a cylindrical mill having a capacity of 6 liters and containing 8,000 g of 6 mm steel balls. The resulting dispersion is pressure-filtered through a 5μ paper filter. Polyester base film is coated with the dispersion by means of a knife coater. Orientation of the magnetic particles is effected by causing the coated film to move past the cheeks of a powerful permanent magnet. Before the dispersion is fed to the coater, it passes through a stirred cylindrical vessel (1) (see FIGS. 1*a* and 1*b*) having an internal diameter of 6.5 cm and a length of 7 cm in which a shaft (2) rotates in the absence of air. The shaft is provided with a dissolver disc (3) having a zigzag edge and a diameter of 5 cm. The magnetic dispersion enters through the inlet (4) and leaves through the outlet (5). The stirred vessel is sealed from the atmosphere by a cover (6) provided with a gasket.

Figure 2:
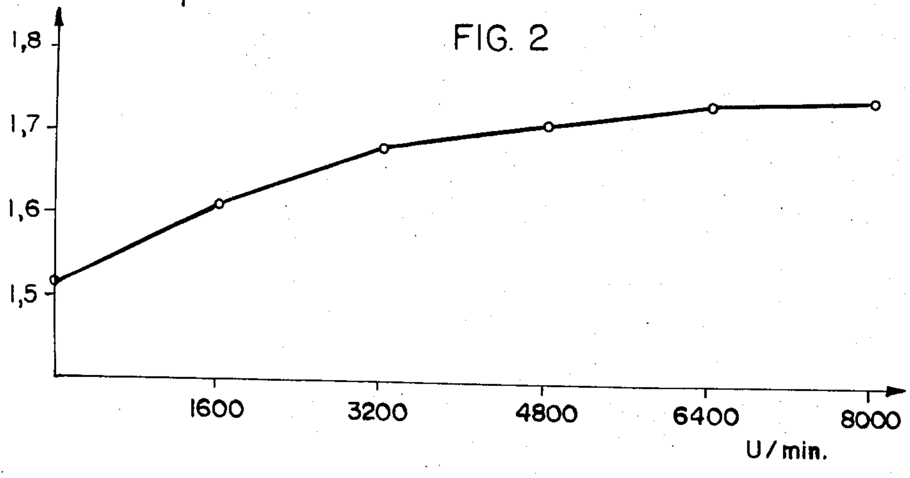
FIG. 2 is a graph showing the relationship of the speed of rotation of the rotating disc or cylinder to the orientation ratio of the magnetic recording media.
Figure 2:
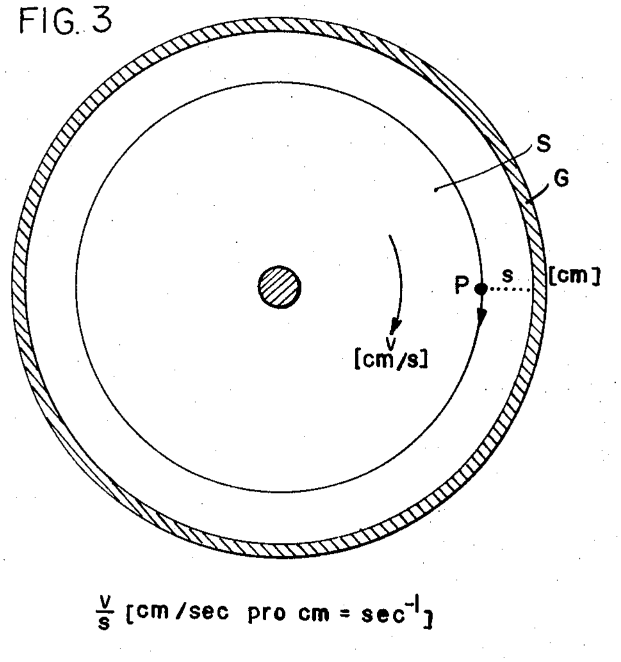

The throughput is from 100 to 400 ml/min. This stirring system may be operated at various speeds. FIG. 2 is a graph showing the orientation ratio plotted against stirrer speed.

The magnetic coating is dried, in this and the following Examples, in a conventional manner by heating at from 60° to 85°C.

EXAMPLE 2

Example 1 is repeated at a stirrer speed of 4,800 r.p.m. except that the cylindrical tube in which the stirrer rotates is closed at its inlet and outlet ends by gauze and contains 0.75 kg of 1 mm steel balls. The orientation ratio obtained is 1.78. If the process is repeated omitting the shearing step, the orientation ratio is only 1.51. The improvement in the orientation ratio results in a distinct improvement in the signal level and in the signal-to-noise ratio.

EXAMPLE 3

A magnetic dispersion is prepared from the following:

700 g of acicular γ-iron(III) oxide having a weakly acid surface, 42 g of carbon black pigment, 7 g of soya lecithin, 1,000 g of a 20 percent solution of a polyester/polyurethane resin (prepared by reacting p,p'-diphenylmethane diisocyanate with adipic acid and 1,4-butanediol) in tetrahydrofuran, and 700 g of tetrahydrofuran. Dispersion is carried out for 96 hours in a cylindrical mill having a capacity of 6 liters and containing 8,000 g of 8 mm steel balls. Following the procedure described in Example 1, the dispersion is filtered and applied by means of a knife coater to polyester sheeting having a thickness of 25μ to give a dry magnetic coating 12μ in thickness. The same stirred vessel equipped with a dissolved disc as described in Example 1 is used. When the dissolver disc is not rotated, the orientation ratio obtained in 1.6. When the disc is rotated at 4,800 r.p.m., the orientation ratio is raised to 1.84. This improvement is accompanied by a reduction in the average peak-to-valley height in the resulting magnetic coating from 0.32μ without stirring to 0.21μ with the shearing step.

We claim:

1. In a process for the manufacture of magnetic recording media by coating a non-magnetic base with a viscous liquid magnetic pigment dispersion in a binder solution followed by orienting the applied magnetizable particles in a magnetic field and drying the applied magnetic pigment dispersion, the improvement in which the viscous liquid magnetic pigment dispersion is subjected, immediately prior to the coating step, to shear at a shear rate of more than 750 cm/sec and a shear rate gradient of more than 1,100 $sec^{-1}$.

* * * * *

UNITED STATES PATENT AND TRADEMARK OFFICE

CERTIFICATE OF CORRECTION

PATENT NO. : 3,836,395

DATED : September 17, 1974

INVENTOR(S) : Herman Roller, et al.

It is certified that error appears in the above-identified patent and that said Letters Patent are hereby corrected as shown below:

In the heading, insert--[30] Foreign Application Priority Data, April 22, 1971, Germany, P 21 19 569.7--.

Signed and Sealed this

*seventh* Day of *October 1975*

[SEAL]

*Attest:*

RUTH C. MASON
*Attesting Officer*

C. MARSHALL DANN
*Commissioner of Patents and Trademarks*